United States Patent [19]

Sebens et al.

[11] 4,162,379

[45] Jul. 24, 1979

[54] APPARATUS FOR DERIVING A FEEDBACK CONTROL SIGNAL IN A THERMAL SYSTEM

[75] Inventors: Carl R. Sebens, Stratford; Chester G. Fisher, III, Southport, both of Conn.

[73] Assignee: The Perkin-Elmer Corporation, Norwalk, Conn.

[21] Appl. No.: 772,162

[22] Filed: Feb. 25, 1977

[51] Int. Cl.² .............................................. H05B 1/02
[52] U.S. Cl. .................................... 219/497; 219/504; 219/501; 219/130.33
[58] Field of Search ................... 219/135, 131 R, 497, 219/482, 488, 498, 489, 499, 490, 504, 501

[56] References Cited

U.S. PATENT DOCUMENTS

| Re. 29,441 | 10/1977 | Ericsson | 219/135 |
|---|---|---|---|
| 3,752,956 | 8/1973 | Cahill et al. | 219/499 |
| 3,789,190 | 1/1974 | Orosy et al. | 219/497 |
| 3,896,287 | 7/1975 | Cook | 219/131 R |
| 3,924,102 | 12/1975 | Hanekom | 219/497 |
| 3,965,396 | 6/1976 | Tyler et al. | 219/499 |

FOREIGN PATENT DOCUMENTS

| 2447669 | 4/1976 | Fed. Rep. of Germany | 219/497 |
|---|---|---|---|
| 1210432 | 10/1970 | United Kingdom | 219/497 |
| 493778 | 2/1976 | U.S.S.R. | 219/497 |

Primary Examiner—Bruce A. Reynolds
Assistant Examiner—M. H. Paschall
Attorney, Agent, or Firm—S. A. Giarratana; F. L. Masselle; E. T. Grimes

[57] ABSTRACT

Power is applied to an electrical element in maintaining a thermal system at stabilized conditions and a feedback signal is derived to control the electrical input to the heating element by linearly combining functions of the current through the heating element and the voltage drop thereacross respectively. In one embodiment, each of the linearly combined functions in the feedback signal can be varied independently to change the stabilized conditions of the thermal system, while in another embodiment a microprocessor is incorporated to provide such variation for a sequential range of stabilized conditions.

1 Claim, 5 Drawing Figures

APPARATUS FOR DERIVING A FEEDBACK CONTROL SIGNAL IN A THERMAL SYSTEM

BACKGROUND OF THE INVENTION

The present invention relates to apparatus for deriving a feedback control signal in a thermal system wherein an electrical element supplies heat to maintain stabilized conditions. Such apparatus is commonly known in the art but all known apparatus are either nonfunctional at very high temperatures, such as 2500 degrees centigrade or produce substantial control error as electrothermal parameters vary such as the resistance of the heating element. Typical of the nonfunctional apparatus is that in which a temperature feedback signal is derived by using a thermocouple that is located within the controlled zone of the thermal system. Prior art apparatus wherein feedback control signals are derived within electrothermal systems from either the current through, or the voltage across, or the power input to the heating element thereof are typical of those with which substantial control error is encountered.

SUMMARY OF THE INVENTION

It is the object of this invention to reduce the control error of electrothermal systems with an adaptive control arrangement wherein a feedback signal is derived by linearly combining functions of the current through an electrical heating element and the voltage thereacross respectively.

It is another object of this invention to vary the linearly combined functions thereof independently in changing the stabilized conditions of the thermal system or reducing the control error that is caused from variation in a plurality of electrothermal parameters.

It is still another object of this invention to incorporate a microprocessor therein for varying the linearly combined functions thereof to obtain a sequential range of stabilized conditions.

These objects are accomplished according to one embodiment of the present invention by monitoring both the current flow through a heating element within the thermal system and the voltage drop thereacross, with functions of each monitored level being linearly combined by a differential amplifier from which the output is the feedback signal. In other embodiments, the functions of the monitored levels in the feedback signal are varied to set the stabilized conditions of the thermal system and a microprocessor is incorporated to change those functions accordingly, where the electrothermal parameters of the system are variable.

BRIEF DESCRIPTION OF THE DRAWINGS

The manner in which these and other objects of the present invention are achieved will be understood from the following description, the appended claims, and the attached drawings wherein:

DESCRIPTION OF THE PREFERRED EMBODIMENTS

Figure 1:
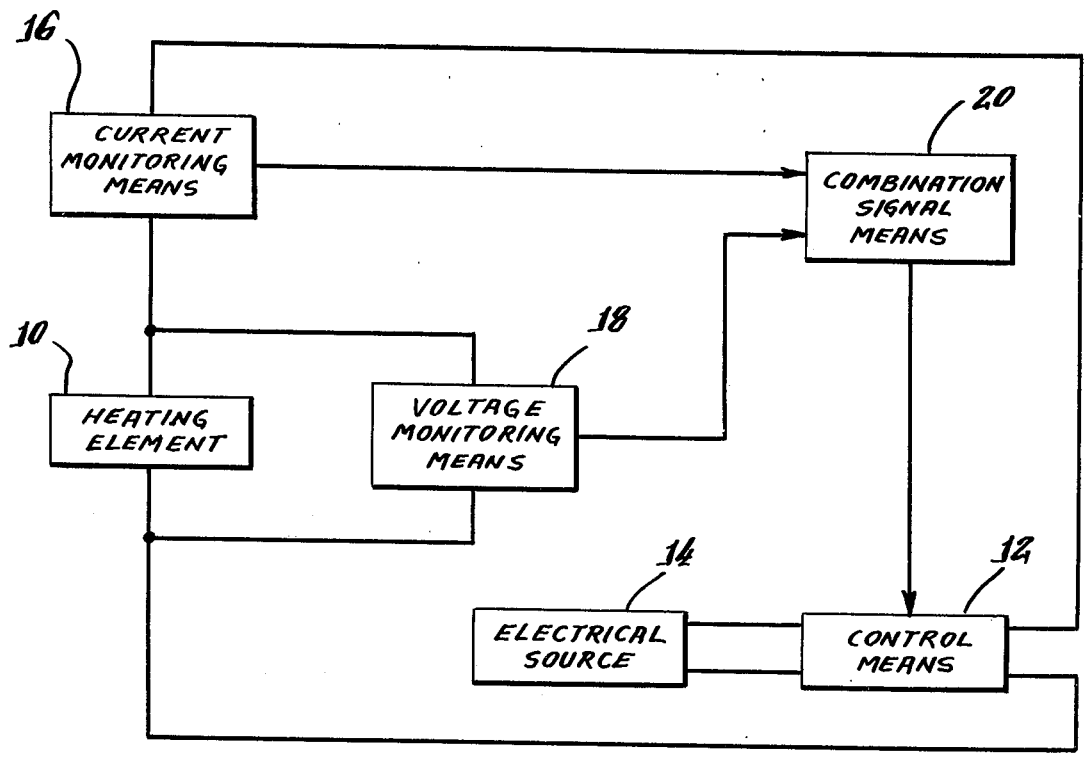
FIG. 1 is a block diagram of a control arrangement for an electrothermal system with the feedback signal apparatus of this invention incorporated therein.

Turning now to the drawings, the feedback signal apparatus of this invention is incorporated within the block diagram of FIG. 1 where an electrical input to the heating element 10 is otherwise conventionally controlled to maintain the stabilized conditions of a thermal system (not completely shown). A means 12 for controlling the output of an electrical source 14 is connected to the heating element 10 through a means 16 for monitoring the current flow therethrough while a means 18 for monitoring the voltage drop across the heating element 10 is connected thereacross. Signal outputs from the current monitoring means 16 and the voltage monitoring means 18 are separately connected as inputs to a means 20 for linearly combining functions of its independent input signals. Output from the combination signal means 20 is connected as a feedback signal to the control means 12 wherein it is compared with a preset level to produce a control signal in accordance with well-known prior art.

Of course, the independent contributions in the output of the combination signal means 20 are each variable as functions of the current flow through the heating element 10 and the voltage drop thereacross respectively. Therefore, the feedback signal apparatus of this invention advances the art of thermal control systems by providing adaptive control with which the stabilized conditions of the thermal system are precisely established even though the electrothermal parameters of the system may change. One important stabilized condition of most thermal systems is temperature which has been difficult to precisely control with prior art apparatus that is functional at very high temperatures because the resistance of the heating element 10 changes with temperature, and/or use, and/or replacement. As an example, increased resistance causes substantial control error to be encountered when the feedback signal is only derived from either the current flowing through the heating element 10 or the voltage drop thereacross in that disproportionately greater heat is developed as the temperature increases for the former, whereas disporportionately less heat is developed as temperature increases for the latter. Even when the feedback signal is derived from the power being dissipated by the heating element 10, considerable control error is often encountered due to changes in other electrothermal parameters of the system as is discussed below.

Figure 2:
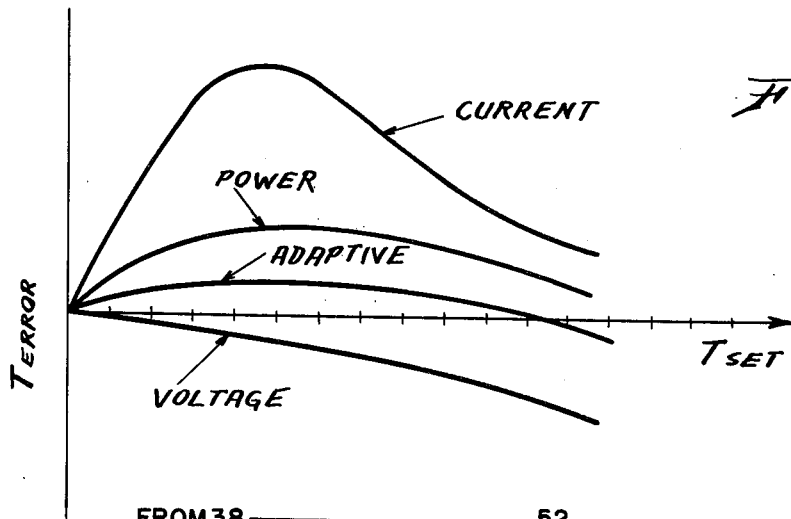
FIG. 2 is a plot of control error curves for comparing prior art apparatus with that of the invention.
Figure 3:
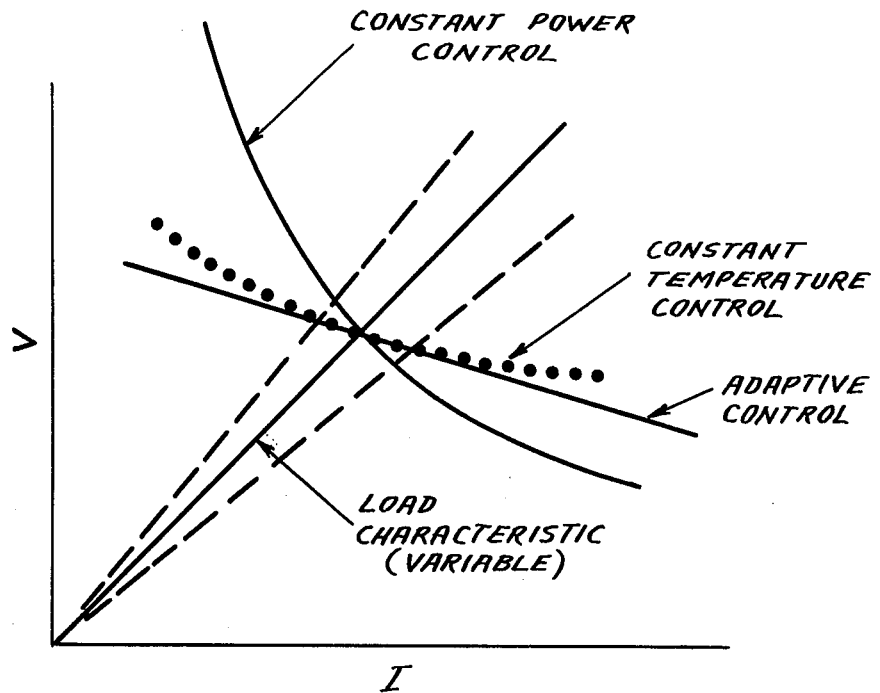
FIG. 3 is a plot of the current through a graphite furnace within an atomic absorption spectrophotometer and the voltage drop thereacross in which the precise control possible with the apparatus of the invention is demonstrated at a high temperature level.

That the apparatus of this invention reduces the control error encountered with prior art apparatus has been demonstrated by precisely controlling the temperature of a graphite furnace within an atomic absorption spectrophotometer which develops temperatures up to 3000° centigrade. In FIG. 2, the control error encountered with the feedback signal apparatus of this invention is plotted along with that encountered by the above discussed prior art apparatus in the same thermal system of the spectrophotometer, for purposes of comparison. The graphite furnace is also exemplary of the complexities that are encountered in the control of very high temperature systems because variation in electrothermal parameters of the graphite furnace other than its electrical resistance are confronted, such as its physical dimensions and thermal conductivity. Typical of the variation in physical dimensions alone is that the wall thickness of a tubularly shaped graphite furnace can vary, which of course, affects thermal heat transfer therefrom. The precise control of the graphite furnace was attained with the apparatus of this invention as shown in FIG. 3 where a typical load characteristic curve is plotted, with the variation due to manufacturing tolerances being shown as dotted lines to either side thereof. The actual control curve for maintaining a constant temperature as electrothermal parameters of the graphite furnace vary and the constant power control curve are shown in comparison with the results achieved with the adaptive feedback control of this invention.

Figure 4A:
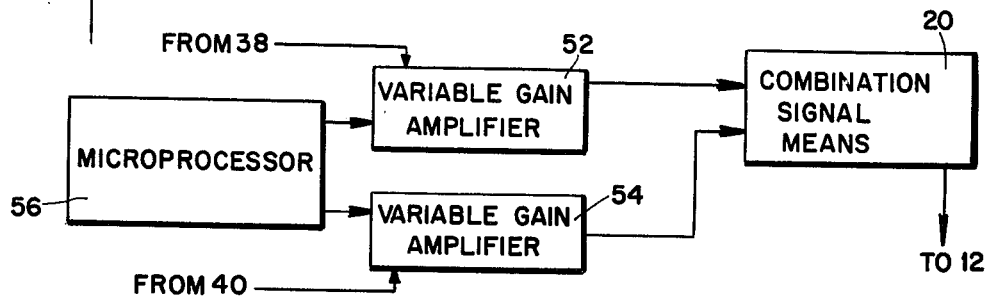
FIG. 4A is a block diagram showing a modification of the embodiment of FIG. 4.
Figure 4:
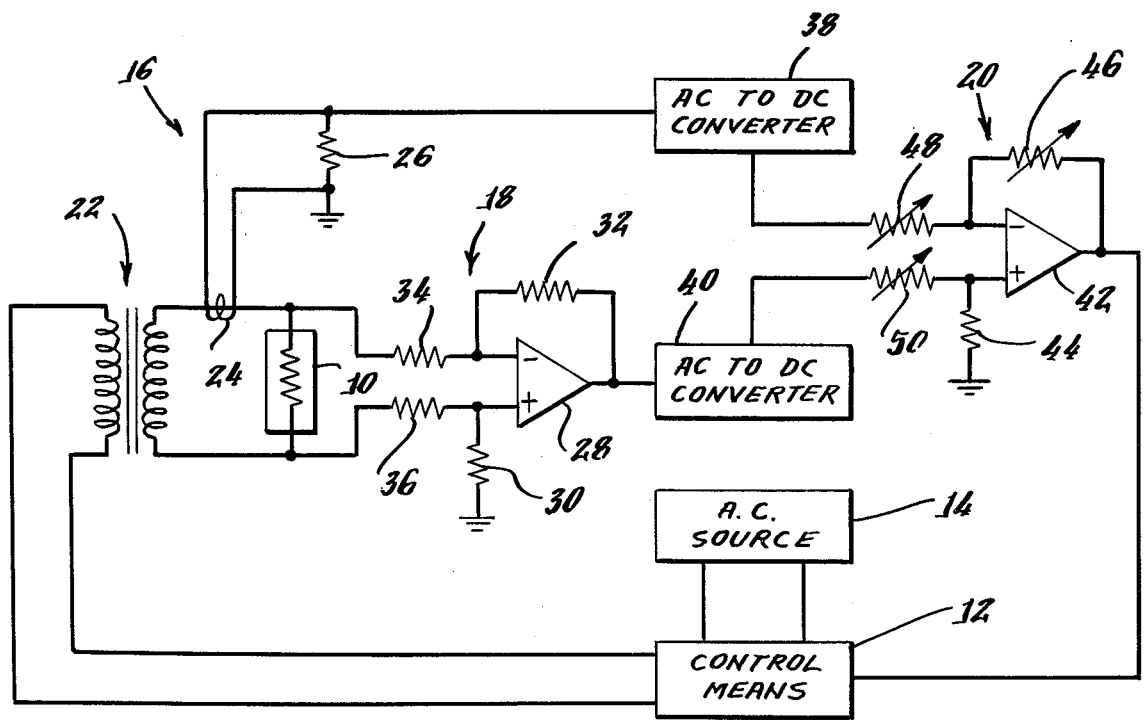
FIG. 4 is a combined schematic and block diagram for the embodiment of this invention from which the error curve of FIG. 2 and the precise control of FIG. 3 were derived.

The circuit utilized in the spectrophotometer furnace embodiment of this invention from which the results shown in FIGS. 2 and 3 were obtained, is illustrated in FIG. 4 where the control means 12 supplies alternating current through a transformer 22 to the graphite furnace 10 which is the heating element in this embodiment. The current monitoring means 16 includes a toroidal coil 24 which is disposed about one of the electrical connections to the furnace 10 and from which the output is connected across a resistor 26 with one side thereof being grounded. The voltage monitoring means 18 includes an operational amplifier 28 which has the noninverting input thereof grounded through a resistor 30 and the output thereof connected to the inverting input thereof through a resistor 32, while the inputs thereof are also connected separately across the furnace 10 through resistors 34 and 36. Because of the alternating current input to the furnace 10, the outputs from the current monitoring means 16 and the voltage monitoring means 18 are separately connected to the inputs of the combination signal means 20 through AC to DC converters 38 and 40 respectively. The combination signal means 20 includes an operational amplifier 42 which has the noninverting input thereof grounded through a resistor 44 and the output thereof connected to the inverting input thereof through a variable resistor 46, while the inverting and noninverting inputs thereof are also connected separately to the outputs of the AC to DC converters 38 and 40 respectively, through variable resistors 48 and 50 respectively.

Of course, the alternating current in the toroidal coil 24 and the AC voltage drop across the resistor 26 are both proportional to the alternating current flow through the furnace 10, so that the DC output voltage from converter 38 is also proportional to the alternating current flow through the furnace 10. Those skilled in the electrical arts will readily understand that operational amplifiers 28 and 42 are each arranged to function in a differential mode in that the outputs therefrom are equal to the algebraic difference between well-known functions of the voltage levels on the resistors at their inverting and noninverting inputs. Therefore, the outputs from operational amplifier 28 and converter 40 are proportional to the AC voltage difference or drop across the furnace 10 with the values of resistors 30, 32, 34 and 36 determining that proportionality. Because of variable resistors 46, 48 and 50, the algebraic difference between variable functions of the outputs from the converters 38 and 40 may be presented at the output of operational amplifier 42. Therefore, the feedback signal from the combination signal means 20 to the control means 12 is the linearly combination of variable functions that relate to the current through the furnace 10 and the voltage drop thereacross respectively.

In the feedback signal apparatus of this invention from which the control error curve of FIG. 2 and the precise temperature control of FIG. 3 was obtained, the resistance values of the resistors within the combination signal means 20 were resistor 44 at 10K ohms, resistor 46 at 1.82K ohms, resistor 48 at 10K ohms, and resistor 50 at 0 ohms throughout the operation thereof. Otherwise, the control means 12 was of conventional type wherein silicon controlled rectifiers were connected to establish the on/off duty cycle of each half wave from the AC electrical source 14. The gate of each SCR was connected separately to alternate outputs of a pulse generator that was driven by a phase detector which compared output from an RC oscillator with the frequency of the AC electrical source 14. Output from a differential amplifier drove the RC oscillator, with the feedback signal from the apparatus of this invention and a set point voltage being connected to the inputs of this differential amplifier.

Except for the resistance of the graphite furnace 10 in the FIG. 4 embodiment, the parameters of the thermal system in the spectrophotometer are relatively constant. Therefore, the values of variable resistors 46, 48 and 50 could be fixed during the operation thereof that is plotted in FIG. 3 without encountering substantial control error. However, even the very small control error that was encountered could have been overcome by adjusting these variable resistors 46, 48 and 50. Furthermore, those skilled in the electrical arts will realize without further explanation that the inputs to the combination signal means 20 in FIG. 4 could be made through variable gain amplifiers 52, 54; FIG. 4A which are automatically adjusted by a microprocessor 56 or other circuitry to obtain ideal control of stabilizied conditions throughout a range of operation with the feedback signal apparatus of this invention in other thermal systems of greater complexity. Otherwise, thermal systems of greater complexity may require that the linearly combined functions of the current through the furnace 10 and the voltage drop thereacross respectively, be summed. In such an embodiment, operational amplifier 42 in FIG. 4 would be connected with the noninverting input thereof grounded and the output therefrom connected to the inverting input thereof through a first resistor. Each output from the current monitoring means 16 and the voltage monitoring means 18 would be connected to the inverting input thereof through second and third variable resistors respectively. Output from the operational amplifier would then be the algebraic sum of variable functions that relate to the current through the furnace nd the voltage drop thereacross with such functions being proportional to the ratios of the first variable resistor to the second and third variable resistors respectively. Those skilled in the art will also appreciate without further explanation that the feedback signal apparatus of this invention could be incorporated into arrangements where the control means 12 of the FIG. 1 embodiment supplies direct current to the heating element 10 and therefore the scope of this invention is not limited to the alternating current embodiment of FIG. 4.

Although this invention has been disclosed herein by describing only a few embodiments thereof, it should be understood by those skilled in the art that numerous changes in the details of construction and the combination or arrangement of parts could be made in the described embodiments without departure from the true scope and spirit of the invention. Therefore, the present disclosure should be construed as illustrative rather than limiting.

What we claim is:

1. In an atomic absorption spectrophotometer, which develops temperatures up to at least about 3000° C., having heat supplied by applying alternating current to an electrical element, the combination comprising:

means for monitoring the current flow through the heating element including a toroidal coil disposed about one electrical connection to the heating element while output from said toroidal coil is connected across a resistor with one side thereof being grounded;

means for monitoring the voltage drop across the heating element including an operational amplifier having the noninverting input thereof grounded through a first resistor and the output therefrom connected to the inverting input thereof through a second resistor while said inputs thereof are also connected separately across the heating element through third and fourth resistors respectively, output from said operational amplifier being proportional to the voltage drop across the heating element in accordance with the values of said resistors; and means for linearly combining independent functions of the outputs from said current monitoring means and said voltage monitoring means as a composite signal; including a second operational amplifier having the noninverting input thereof grounded through a first resistor and the output therefrom connected to the inverting input thereof through a first variable resistor, each output from said current monitoring means and said voltage monitoring means being separately connected to the inverting and noninverting inputs of said second operational amplifier through AC to DC converters and second and third variable resistors respectively, the output from said second operational amplifier being the algebraic difference between variable functions relating to the outputs from said current monitoring means and said voltage monitoring means with the variability being in proportion to said first, second and third variable resistors; said first, second and third variable resistors being variably responsive to the variation of the electrothermal parameters of the graphite furnace.

* * * * *